United States Patent Office 2,996,360
Patented Aug. 15, 1961

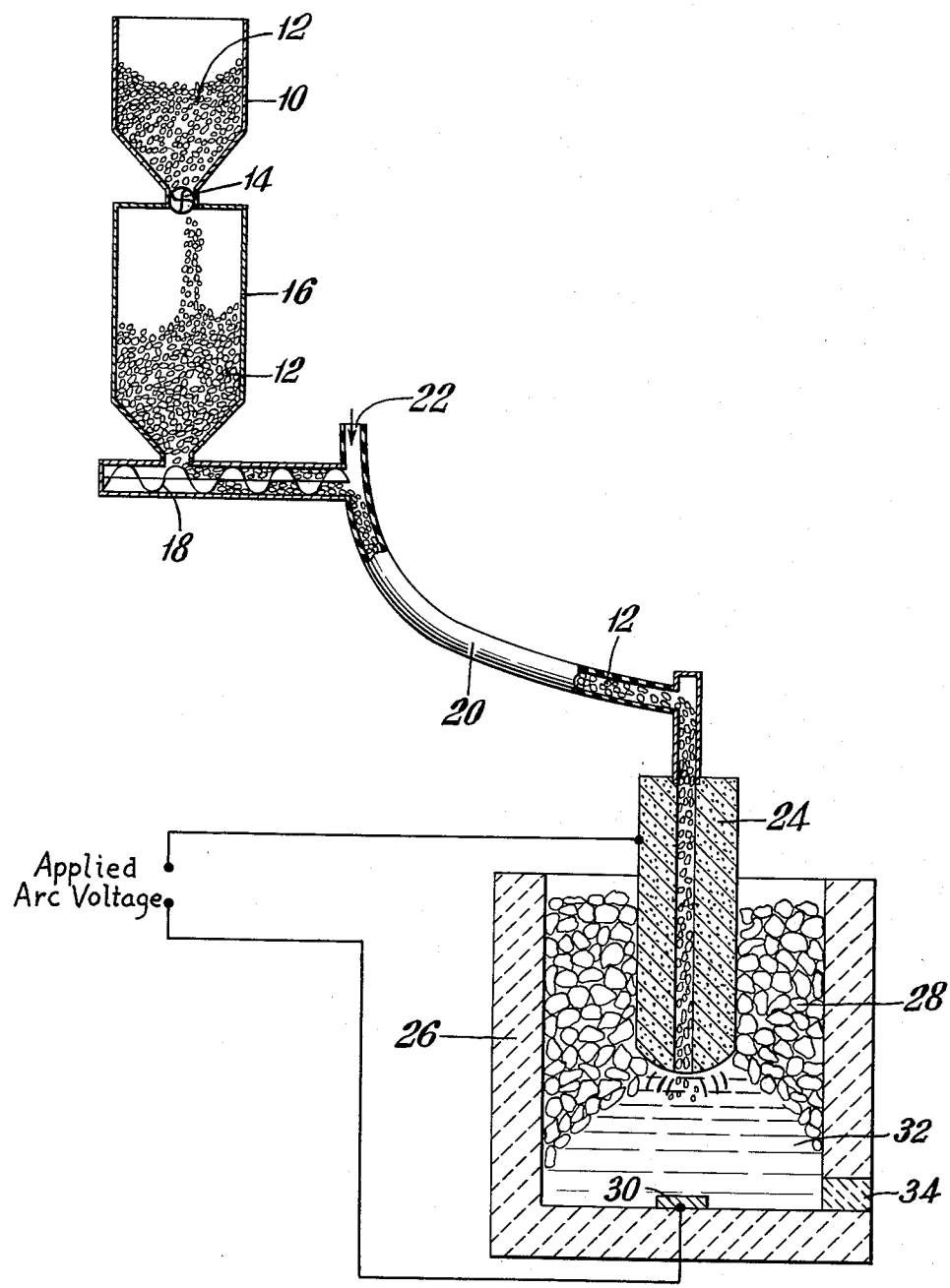

2,996,360
CALCIUM CARBIDE PRODUCTION
August M. Kuhlmann, Niagara Falls, N.Y., assignor to Union Carbide Corporation, a corporation of New York
Filed Nov. 21, 1958, Ser. No. 775,551
3 Claims. (Cl. 23—208)

This invention relates to a process for the production of calcium carbide.

In the manufacture of calcium carbide in an electric furnace, prior practice calls for the introduction of a calcium carbide forming coke-lime and/or coke-coal-lime mixture around an electrode in an electric furnace. Electrical energy supplies the necessary heat to convert the calcium carbide forming mixture to calcium carbide and carbon monoxide.

Very few changes have been made in electric furnace carbide manufacture since the original process was devised. Certain disadvantages, which were inherent in the original process, were gradually accepted over the years and are presently considered conditions under which it is normal for calcium carbide to be manufactured. For example, if a calcium carbide forming coke-lime mixture contained an excessive amount of finely-divided particles, a substantial portion of these particles were screened out so they would not interfere with proper furnacing operations. In addition, if a substantial portion of these particles, i.e., particles having a diameter on the order of about one-quater inch and smaller were not removed during furnacing operations, a large proportion of such particles would be carried out of the furnace by a strong evolution of carbon monoxide gas evolved during the calcium carbide forming reaction. The loss of these particles adds materially to the costs of producing calcium carbide and also pollutes the atmosphere. In general, sufficient disadvantages result from the presence of excessive amounts of finely-divided particles in the charged mixture so that it has been found more expedient to remove these particles from the mixture and to either discard them or, if possible, use them in other operations.

Another problem inherent in prior processes for the production of calcium carbide, but one which also has been accepted as a condition that cannot be avoided, is the excessive consumption of electrode material. This is generally attributable to the intense heat generated at the tip of the electrode.

Accordingly, it is the primary object of this invention to provide an improved process for the production of calcium carbide, wherein finely-divided particles of lime and carbonaceous reducing agent are advantageously utilized in calcium carbide production.

Another object of this invention is to provide an improved process for the production of calcium carbide, wherein electrode consumption is substantially reduced.

Other aims and advantages of this invention will be apparent from the following description and appended claims.

This invention relates to an improvement in a process for the production of calcium carbide from a lime and carbonaceous reducing agent mixture, wherein the reactants are packed around at least one carbon heating electrode in a submerged arc electric furnace and electrical energy is supplied to the electrode to furnish heat, whereby the lime-carbonaceous reducing agent is reacted to produce calcium carbide and carbon monoxide, which improvement comprises employing at least one hollow carbon heating electrode and passing finely-divided particles of at least one of the reactants into the furnace, during the course of the reaction between the lime-carbonaceous reducing agent mixture, through the hollow portion of the hollow electrode, whereby the finely-divided particles are reacted at the tip of the hollow electrode to produce calcium carbide and carbon monoxide. The total amount of the lime and carbonaceous reducing agent present in the electric furnace is maintained in calcium carbide forming proportions.

An embodiment of apparatus suitable for use in practicing this invention is shown in the single figure of the drawing which is a cross-sectional elevational view of an electric furnace and auxiliary apparatus.

In the drawing an electric furnace 26 is provided with a hollow carbon heating electrode 24, inserted therein. A lime-carbonaceous reducing agent mixture having a substantial portion of finely-divided particles removed therefrom is packed around hollow carbon heating electrode 24. Conduit 20, communicating with hollow carbon heating electrode 24, is provided with a gas-inlet means 22. Associated with electric furnace 26 and hollow carbon heating electrode 24 is auxiliary apparatus. Open hopper means 10 for holding finely-divided particles 12 of lime and/or carbonaceous reducing agent is provided with a valve means 14 for controlling the flow rate of finely-divided particles 12 to pressurized hopper means 16. The finely-divided particles 12 from pressurized hopper means 16 are carried by screw conveyor 18 to conduit means 20.

In the submerged arc electric furnace illustrated in the drawing an electrical voltage is applied, in accordance with the usual practice, to electrode 24 and electrically conductive button 30. An arc is thereby initiated and maintained at tip of the electrode. When the reaction between the coarse particles of lime and carbonaceous matter embedding the electrode and submerging the electrode tip has been substantially completed, due to the heat supplied from the submerged arc at the tip of the electrode, the molten calcium carbide is withdrawn from the furnace by removing plug 34. The process may then be repeated.

In practicing this invention, a calcium carbide lime and carbonaceous reducing agent mixture is prepared and a substantial portion of the finely-divided particles are removed therefrom, e.g., about 90 percent of the finely-divided particles of lime and about 80 percent of the finely-divided particles of carbonaceous reducing agent. The lime and carbonaceous reducing agent mixture is charged to an electric furnace around at least one hollow carbon heating electrode and electrical energy supplies the needed heat to convert the mixture to calcium carbide and carbon monoxide. Depending upon the amount of reactants charged around the hollow carbon heating electrode, it has been found that any desired ratio of lime and carbonaceous reducing agent, such as coke, coal, carbon, or a mixture thereof, from 0 percent lime and 100 percent carbonaceous reducing agent to 0 percent carbonaceous reducing agent and 100 percent lime can be fed into the reaction zone of the furnace through the hollow electrode. However, in order to produce the desired grade calcium carbide, it is necessary to maintain a correct over-all calcium carbide forming proportion of lime and carbonaceous reducing agent in the furnace, that is, the total of the reactants around the hollow electrode plus the total of the reactants fed through the hollow electrode. The lime and carbonaceous reducing agent employed to produce calcium carbide and carbon monoxide can be present in substantially stoichiometric proportions, preferably however, about a 5 to 20 weight percent excess of lime over the stoichiometric proportion is desirable.

For the purposes of this invention the carbon of the hollow carbon heating electrode can be in the amorphous or graphitic form and the hollow electrode can be of the prebaked or self-baking type.

Due to the variation in gas pressure at the electrode tip, a downward flow of gas through the hollow electrode can be used. This downward flow of gas balances the gas pressure at the electrode tip and, thus, insures a free fall of the particles through the hollow electrode. It also insures that the gases present in the furnace will not flow up the hollow electrode and, therefore, there will be no condensation of calcium and calcium carbide vapor at the hollow electrode tip and no escape of carbon monoxide to the atmosphere. The gas employed may also be utilized as a carrier gas for the finely-divided particles that are fed through the hollow carbon heating electrode directly into the reaction zone of the electric furnace. Any gas inert to the reactants and reaction products, such as carbon monoxide, carbon dioxide, nitrogen, argon, helium, and the like, can be employed for this purpose. However, if the selected gas evolves oxygen, it is desirable to use a reactive form of carbon, for example, charcoal or low temperature coke, to react with the oxygen and thereby prevent reaction of the evolved oxygen with the hollow electrode. In addition, hydrocarbon gases, such as methane and natural gas, may be used; however, since the gases give off free carbon at elevated temperatures, their use may, for example, result in plugging of the hollow passage in the electrode.

The distribution of finely-divided particles at the electrode tip is a contributing factor in reducing electrode consumption. The manner in which the finely-divided particles aid in reducing electrode consumption is not clearly understood; however, it is believed that the presence of these particles effect cooling in the area of the electrode tip. In addition, this invention has the added advantage of permitting deeper electrode penetration during furnacing operations. If deeper electrode penetration is not desired, a higher voltage may be used to maintain the same penetration. This results in advantages that are well-known in the art.

It is desirable, although not critical to the success of the invention, that the passage in the hollow electrode have a diameter of at least about eight times the diameter of the largest-sized particles being passed therethrough so as to insure a free fall of these particles into the reaction zone of the furnace.

During calcium carbide production, carbon monoxide evolution generally carries off those finely-divided particles having a diameter of about one-quarter inch and smaller. For this and other reasons heretofore given, it is desirable to separate a substantial portion of these finely-divided particles prior to charging the calcium carbide forming mixture to the furnace. In accordance with this invention, the finely-divided particles so separated from the calcium carbide forming mixture and/or any additional quantities of lime and/or carbonaceous reducing agent can be passed through the hollow carbon heating electrode directly into the reaction zone of the furnace as long as the total amount of reactants in the furnace are maintained in calcium carbide forming proportions. If additional quantities of lime and/or carbonaceous reducing agent are passed through the electrode, these reactants can be obtained at a considerable saving since carbonaceous materials, such as by-product coke and petroleum coke, and finely divided particles of lime are less expensive than the larger-sized particles. It is to be understood, however, that finely divided particles having a diameter greater than about one-quarter inch but preferably less than about one inch and smaller can be fed through the hollow carbon heating electrode provided the passage in the electrode is made large enough to enable a free fall of such particles.

To further illustrate this invention, calcium carbide was manufactured by the hollow carbon heating electrode process of this invention.

The lime and coke employed had the following analysis:

*Lime*

| Composition: | Percent |
|---|---|
| CaO | 87.65 |
| MgO | 1.66 |
| $CO_2$ | 5.05 |
| $Fe_2O_3$ | 0.49 |
| $Al_2O_3$ | 0.28 |

*Coke*

| Composition: | Percent |
|---|---|
| Free carbon | 85.98 |
| Volatile carbon | 1.72 |
| Ash | 12.30 |

An 8 x D screen test resulted in the separation of 7.73 percent of the lime and 15 percent of the coke as the finely divided fraction. This finely divided fraction was fed into the furnace in a carrier gas stream through the hollow carbon heating electrode.

A cylindrical furnace having an inside diameter of 28 to 30 inches and a depth of 30 inches was employed. The volume of the furnace was about 10 cubic feet. The hollow carbon heating electrode employed therein had a passage therethrough of about one inch wide.

A summary of the operating data is set forth below.

*Mix order*

| Reactant Particle Size | Taps No. | Total Coke, lb. | Total Lime, lb. |
|---|---|---|---|
| Coarse | 1–10 | 675 | 1,500 |
| Fine | 1–3 | 45 | 100 |
| Fine | 4–10 | 110 | 200 |

| No. of Taps | $CaC_2$ Tapped, lb. | Mix, lb. | |
|---|---|---|---|
| | | Coarse | Fine |
| 10 | 1,608 | 2,175 | 455 |

The furnace behavior during the hollow carbon heating electrode shows a distinct improvement in surface conditions over that observed in the solid electrode process.

This improvement in the surface conditions was attributable to better porosity of charged materials around the electrode due to removal of a substantial portion of finely-divided particles prior to charging the coke-lime mixture to the furnace.

In another example of this invention, an electric furnace having two solid and one hollow carbon heating electrodes was employed. A calcium carbide forming mix having a ratio of 1000 pounds of lime and between about 560 and 580 pounds of a coke-coal mixture was fed to each of the solid electrodes, while a mix, designed to produce a higher grade carbide, having a ratio of 1000 pounds of lime and between about 625 and 680 pounds of coke-coal mixture was fed through and around the hollow carbon heating electrode.

The screen analysis for the fine mix fed through the hollow carbon heating electrode was as follows:

| Mesh size: | Percent of mix |
|---|---|
| Retained on ¼-inch screen | 15.7 |
| Retained on 8 mesh screen | 34.7 |
| Retained on 20 mesh screen | 20.4 |
| Minus 20 mesh screen | 29.2 |

Additional fines, falling within the following mesh size ranges, were also fed through the hollow carbon heating electrode.

| Mesh size: | Percent range of mix (mesh sizes) |
|---|---|
| Retained on ¼-inch screen | 0.3 to 9.3 |
| Retained on 8 mesh screen | 2.5 to 32.8 |
| Retained on 20 mesh screen | 24.2 to 42.7 |
| Minus 20 mesh screen | 18.2 to 67.4 |

The mix fed around all three electrodes fell into the following ranges of mesh size:

| Mesh Size | Lime, Percent | Coke, Percent |
|---|---|---|
| 3 inches by 2 inches | 15–18 | |
| 2 inches by 1.5 inches | 16–18 | |
| 1.5 inches by 1 inch | 20–23 | |
| 1 inch by 3/4 inch | 11–16 | 4–6 |
| 3/4 inch by 5/8 inch | 5–6 | 4–6 |
| 5/8 inch by 1/2 inch | 5–7 | 7–40 |
| 1/2 inch by 1/4 inch | 8–12 | 2–32 |
| 1/4 inch by down | 7–10 | 6–75 |
| | | 12–20 |

During furnacing operations, carbon monoxide gas was fed down the hollow electrode simultaneously with the fines at a rate of from 20 to 30 cubic feet per minute.

The results of this operation are set forth below.

Power usage _____ 2,169,000 kw. hours.
Calcium carbide produced___ 769 tons.
Power consumption_____ 1.41 kw. hour per pound of $CaC_2$ produced.
Calcium carbide quality_____ 4.71 cu. ft. of $C_2H_2$ per pound.

In this operation about 10.5 percent of the total hollow electrode mix, in the form of one-quarter inch mesh material and finer, was fed to the furnace through the hollow carbon heating electrode.

In another operation, carried out in a manner similar to this one, 19.5 percent of the total hollow electrode mix was fed to the furnace through the hollow carbon heating electrode.

The average electrode consumption for all three electrodes per net ton of calcium carbide produced was 49 pounds. Of this total, the two solid electrodes accounted for 18.2 and 18.4 pounds, respectively, while the hollow carbon heating electrode was only consumed to the extent of 12.4 pounds. The use of the hollow carbon heating electrode resulted in a saving of 32.2 percent in electrode consumption.

What is claimed is:

1. An electric furnace submerged arc process employing a hollow electrode for the production of calcium carbide from both coarse and fine particles of lime and carbonaceous reducing agent, said process comprising embedding the electrode in a packed mixture formed of coarse particles of lime and carbonaceous reducing agent to thereby provide a submerged arc calcium carbide-forming reaction zone at the tip of the electrode; passing fine particles of material corresponding to at least one component of the packed mixture through the hollow electrode into said submerged arc calcium carbide-forming reaction zone; and passing a flow of gas through the hollow electrode toward the tip thereof sufficient to prevent gases from passing from the furnace through the electrode and sufficient to permit free flow of the finely divided particles through the hollow electrode into said reaction zone.

2. An electric furnace submerged arc process employing a hollow electrode for the production of calcium carbide from both coarse and fine particles of lime and carbonaceous reducing agent, said process comprising embedding the electrode in a packed mixture formed of coarse particles of lime and carbonaceous reducing agent having a diameter greater than about 1/4 inch to thereby provide a submerged arc calcium carbide-forming reaction zone at the tip of the electrode; passing fine particles of material having a diameter less than about 1/4 inch and corresponding to at least one component of the packed mixture through the hollow electrode into said submerged arc calcium carbide-forming reaction zone; and passing a flow of gas through the hollow electrode toward the tip thereof sufficient to prevent gases from passing from the furnace through the electrode and sufficient to permit free flow of the finely divided particles through the hollow electrode into said reaction zone.

3. An electric furnace submerged arc process employing a hollow electrode for the production of calcium carbide from coarse and fine particles of lime and carbonaceouts reducing agent, said process comprising separating the coarse particles of lime and carbonaceous reducing agent from the fine particles; embedding the electrode in a packed mixture formed of the coarse particles of lime and carbonaceous reducing agent to thereby provide a submerged arc calcium carbide-forming reaction zone at the tip of the electrode; passing the separated fine particles through the hollow electrode into said submerged arc calcium carbide-forming reaction zone; and passing a flow of gas through the hollow electrode toward the tip thereof sufficient to prevent gases from passing from the furnace through the electrode and sufficient to permit free flow of the finely divided particles through the hollow electrode into said reaction zone.

References Cited in the file of this patent

UNITED STATES PATENTS 601,366     Wilson et al. _____ Mar. 29, 1898

FOREIGN PATENTS 697,108     France _____ Oct. 21, 1930